United States Patent

[11] 3,542,315

| [72] | Inventors | Erich A. Eberl<br>Bruckmuhl;<br>Manfred Schmid, Munich, Germany |
|---|---|---|
| [21] | Appl. No. | 710,466 |
| [22] | Filed | March 5, 1968 |
| [45] | Patented | Nov. 24, 1970 |
| [73] | Assignee | Entwicklungsring Sud G.m.b.H.<br>Munich, Germany |
| [32] | Priority | March 7, 1967 |
| [33] | | Germany |
| [31] | | No. E 33534 |

[54] INSTRUMENT DISPLAY UNIT
5 Claims, 4 Drawing Figs.

[52] U.S. Cl. ..................................... 244/1,
116/129; 244/7; 340/27
[51] Int. Cl. ....................................... B64d 43/00
[50] Field of Search........................................ 33/204;
116/129; 248/27; 340/27; 244/1, 7, 7.1, 7.2, 7.3

[56] References Cited
UNITED STATES PATENTS

| 3,040,698 | 6/1962 | Gray.............................. | 116/129 |
| 3,045,356 | 7/1962 | Uecker........................... | 33/204 |
| 3,307,564 | 3/1967 | Buchholz....................... | 248/291X |

Primary Examiner—Milton Buchler
Assistant Examiner—Jeffrey L. Forman
Attorney—William K. Serp ABSTRACT: An instrument display unit particularly adapted for aircraft applications. The unit includes a pair of instrument display surfaces upon which various measuring devices are mounted. Means are provided for rotating the unit about a common axis parallel to the plane of each of the display surfaces. The unit is mounted adjacent to the rear surface of a conventional instrument panel and positioned so that each of the display panels may be selectively positioned in registration with a viewing cutout defined by the instrument panel.

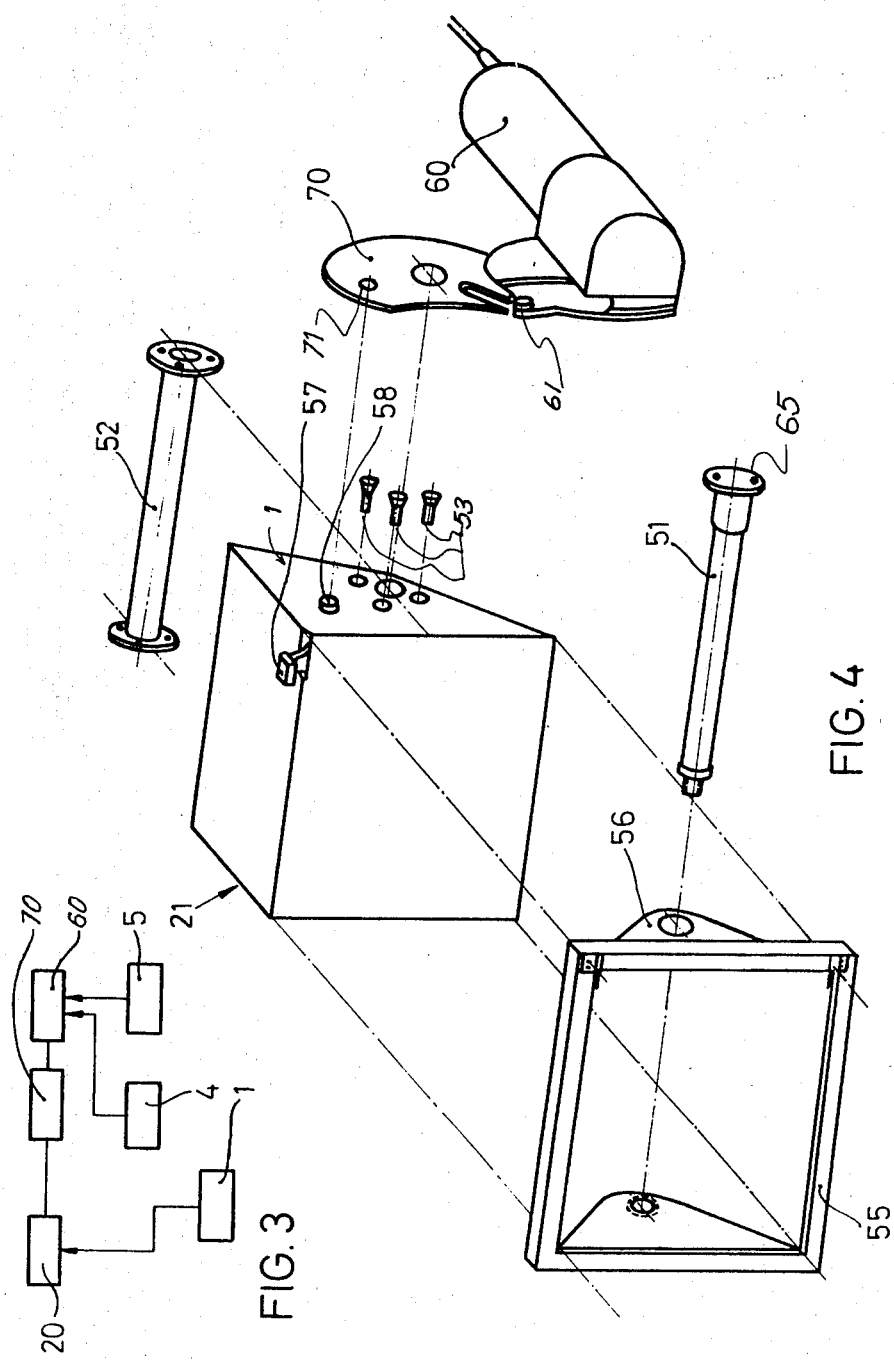

INSTRUMENT DISPLAY UNIT

BACKGROUND OF THE INVENTION

This invention relates to an instrument display unit particularly adapted for use with vertical takeoff and landing (VTOL) aircraft. Present day high-performance aircraft require an ever-increasing number of cockpit displays and controls which must be accommodated in a minimum of available space. Such available space is particularly restricted in vertical takeoff and landing (VTOL) aircraft. In addition to the standard aircraft displays, a number of instruments are required for the visual display of parameters relating to vertical operation, such as the lift engine, degree of tilt of the engine pods, and tilt of the exhaust gas pipes.

Despite the use of space-saving vertically oriented instruments, it has been usually necessary to position a few of the essential meters and gauges in consoles which are not within the pilot's direct field of vision. Further, the instruments necessary for the vertical operation of VTOL aircraft are generally required only for a short time period and thereafter are no longer of importance to the pilot, causing his unnecessary distraction. In the event the pilot becomes disabled, the copilot must be able to direct the movements of the aircraft; therefore, duplicate instrument displays are usually required. Such instruments while needed by the copilot only in the event of an emergency, nevertheless, should be positionable directly within his view during emergency situations.

The illustrated embodiment affords the pilot or copilot a means for selecting one of several instrument displays and positioning same into his field of vision. Instruments that are not immediately required during a particular flight phase may be shifted out of position and other more essential instruments brought into view. Such an arrangement is particularly desirable with regard to instruments which are required only during emergency conditions.

A main object of this invention is to provide an instrument panel which permits the positioning of selected instrument displays into view. Other objects and advantages of the invention will become apparent with reference to the following description and accompanying drawings which show an illustrative embodiment of this invention.

BRIEF DESCRIPTION OF THE DRAWINGS

FIG. 3 is a block diagram of the control system of the apparatus illustrated in FIGS. 1 and 2.

FIG. 4 is an exploded view of the apparatus illustrated in FIG. 1.

DESCRIPTION OF THE PREFERRED EMBODIMENT

Figure 1:
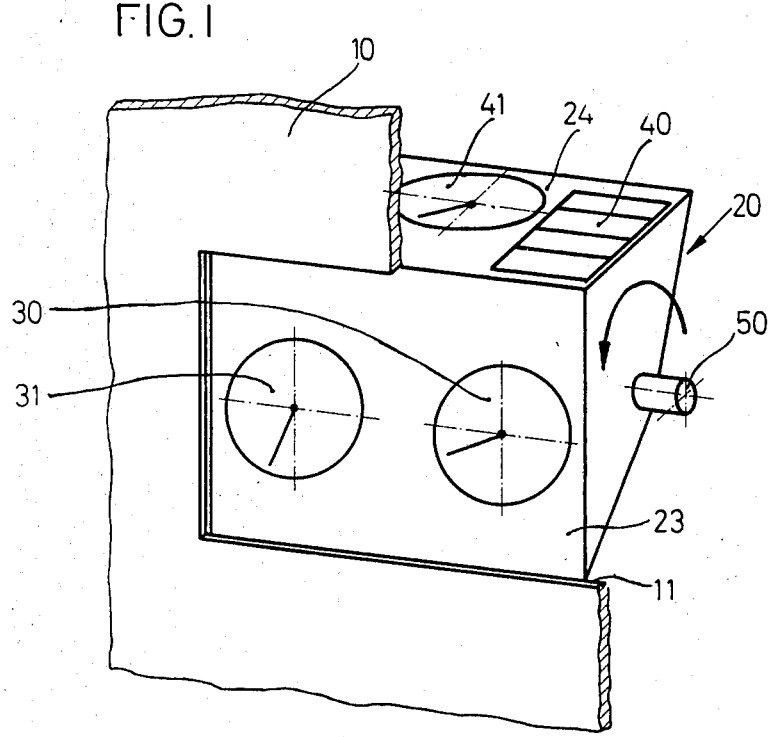
FIG. 1 is a perspective view of an apparatus incorporating certain features of this invention.
Figure 2:
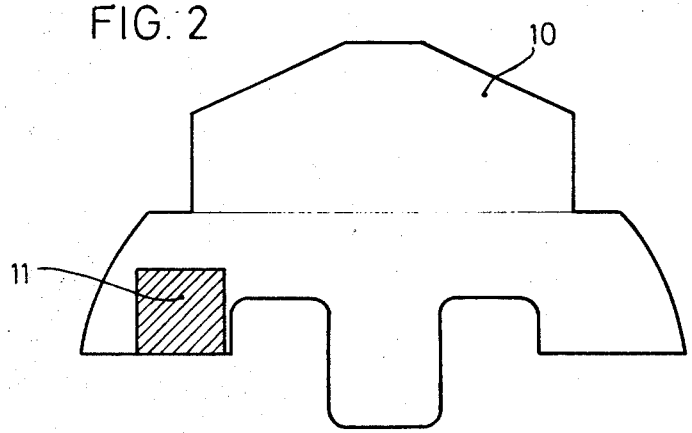
FIG. 2 is a portion of the apparatus illustrated in FIG. 1.

With particular reference to FIG. 1, and instrument panel 10 is illustrated defining a cutout 11. An instrument unit 20 is provided which is oriented in registration with the cutout 11. The instrument unit 20 includes a pair of rectangularly shaped walls 23 and 24 which are rotatable about the axis of a shaft 50. Mounted upon the walls 23 and 24 are measuring instruments 30, 31 and 41 and a gauge 40.

That group of instruments common to all flight phases of the aircraft, which include takeoff, landing, cruise, climb, dive, or acrobatic flight, are preferably mounted on the instrument panel 10. Those instruments required only during certain flight phases which are usually of short duration are mounted in groups upon the walls 23 and 24. For example, the instrument panel 24 may be used to support the lift engine meters and gauges and the panel 23 for those controls pertaining to armament operation. This arrangement is desirable, since combat missions are not usually carried out during takeoff or landing flight. As will hereinafter be further described, the walls 23 and 24 upon which the measuring instruments are mounted are alternately disposed in registration with the cutout 11. Such an alternating operation, although it should be understood that manual control may alternatively be utilized.

Illustrated in FIG. 3 is a block diagram of a control system for rotational operation of the instrument unit 20 of FIG. 1. Rotational movement is initiated by depressing a button 4 or other suitable switch mechanism, thereby energizing a motor 60 which in turn actuates a coupling mechanism 70. Alternatively, rotation of the unit 20 can be initiated automatically by means of a switch mechanism 5 which is actuated in response to a change in the aircraft's flight phase. The switch mechanism 5 also prevents accidental display of the wrong panel in the cutout 11.

As a safety precaution should the automatic and/or motor-driven rotating mechanism fail, manual operation is provided by means of a release mechanism 1 which will hereinafter by more completely described. Further, should the rotational feature of the particular instrument panel be desired only in emergency situations, it may not be necessary to provide a motor. In such situations, manual means may be sufficient to obtain the desired operation. Upon the release of such a manual locking device, rotation may be accomplished by means of spring bias or gravitational pull.

With particular reference to FIG. 4, the instrument unit 20 is rotatable about a central support shaft 50. The unit may be supported upon the fuselage structure or the instrument panel. An escutcheon 55 preferably constructed of light metal is secured by means of brackets 56 to the instrument unit 20. To minimize the acceleration forces upon the drive mechanism, it is preferable that the longitudinal axis of the shaft 50 be oriented parallel to the longitudinal axis of the aircraft. The shaft 50 is journaled through a guide tube 52 which is secured to the inner surface of the side walls of the unit 20 by screw fasteners 53. Rotational operation is accomplished by an electric motor 60 and a coupling mechanism 70. The coupling mechanism 70 comprises a disc having a radially extended slot. The disc is secured to a flange 65 on the shaft 50 and is detachably secured to the unit 20 in a manner to be subsequently described. The electric motor 60 is provided with a pin 61 which engages the disc slot causing limited rotation thereof. Manual operation is accomplished by means of the release mechanism 1 which includes a lever 57. Movement of the lever withdraws a locking pin 58 into the instrument unit 20. During automatic operation, the pin 58 is seated within an opening 71 defined by the disc thus preventing relative movement between the disc 70 and the unit 20. Upon retraction of the locking pin 58, the unit is permitted to rotate freely.

The swivel arrangement of the instrument unit results in a considerable saving of space so that important instruments and controls previously arranged outside the pilot's direct viewing range due to the restricted space conditions can now be installed for rapid movement into the pilot's field of vision. An additional feature is that by means of the illustrated embodiment, it is possible to remove unnecessary instruments from the pilot's view, thereby reducing any distraction they may produce.

We claim:

1. An instrument display unit particularly adapted for use with VTOL aircraft comprising an instrument support unit having at least two substantially flat instrument display surfaces, each of said surfaces being parallel to a common axis, means for supporting said unit for rotation about said common axis, and positioning means for rotating said instrument unit support so as to alternately position either of said instrument display surfaces into view.

2. An apparatus in accordance with claim 1 wherein the axis of said support means is positioned with respect to said aircraft so that the axis of rotation of said instrument unit is generally parallel to the longitudinal axis of the aircraft.

3. An apparatus in accordance with claim 1 wherein said instrument unit is mounted adjacent the instrument panel of the aircraft and wherein the axis of rotation of said instrument unit is generally parallel to the plane of the aircraft instrument panel.

4. An apparatus in accordance with claim 3 wherein the planes of said instrument display surfaces are generally normal to each other.

5. An apparatus in accordance with claim 4 wherein said positioning means comprises an electric motor and which further includes means for selectively disengaging said motor from said instrument support unit to facilitate manual rotation of said instrument unit.